UNITED STATES PATENT OFFICE.

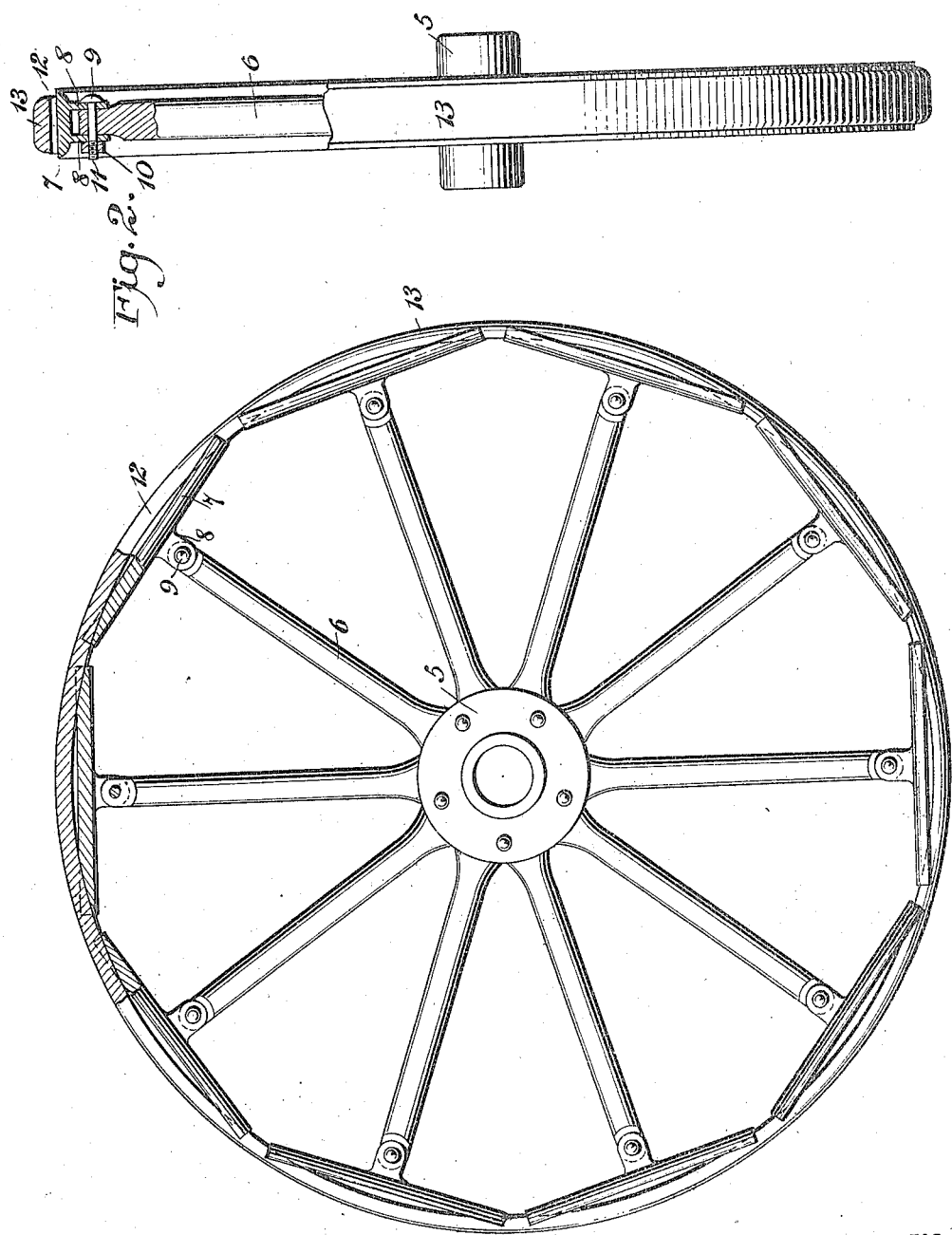

PHILIP NURSE, OF NEW YORK, N. Y.

VEHICLE-WHEEL.

1,233,901.  Specification of Letters Patent.  Patented July 17, 1917.

Application filed March 31, 1914, Serial No. 828,482. Renewed July 6, 1916. Serial No. 107,881.

*To all whom it may concern:*

Be it known that I, PHILIP NURSE, a citizen of the United States, and a resident of the city of New York, borough of Manhattan, in the county and State of New York, have invented a new and Improved Vehicle-Wheel, of which the following is a full, clear, and exact description.

My invention relates to vehicle wheels and has for its object to provide a wheel with spokes extending radially from a hub, a felly being pivoted to each spoke, and there being means for holding in position a rim which is disposed around the fellies.

Additional objects of the invention will appear in the following specification in which the preferred form of my invention is disclosed.

In the drawings similar reference characters refer to similar parts in all the views in which—

Figure 1 is a side elevation of the wheel; and

Fig. 2 is an end view with parts broken away to show the construction.

By referring to the drawings it will be seen that the wheel has a hub 5 with spokes 6 secured thereto and extending radially therefrom, the fellies 7 being mounted at the end of the said spokes 6. Each of these fellies 7 has inwardly disposed flanges 8 spaced apart and disposed at the sides of the fellies, a bolt 9 being disposed through orifices in the flanges 8 and through an orifice in the said spokes. A nut 10 is mounted on the threaded end 11 of each of the bolts 9 to prevent the bolt 9 from becoming displaced. The fellies 7 are provided each with a channel 12 in which a rim 13 is disposed, this rim 13 extending completely around the wheel and being constructed of flexible material to permit a pivotal movement of the fellies 7 relatively to each other by which means the desired resiliency of the wheel is obtained.

Having thus described my invention I claim as new and desire to secure by Letters Patent:

1. In a vehicle wheel, a hub, a plurality of rigid spokes extending from the hub, a plurality of straight fellies, each of the fellies having an outer channel and two inwardly disposed flanges spaced apart and disposed at opposite sides of a spoke and pivoted thereto, and a flexible rim disposed in the channels in the fellies.

2. In a vehicle wheel, a hub, a plurality of rigid spokes extending from the hub, a plurality of fellies, each of the fellies having an outer channel and two inwardly disposed flanges spaced apart and disposed at opposite sides of a spoke and pivoted thereto, and a flexible rim disposed in the channels in the fellies.

3. In a vehicle wheel a hub, a plurality of rigid spokes extending from the hub, a plurality of fellies, pivotal means connecting the fellies with the spokes, and a flexible rim disposed around the fellies.

4. In a vehicle wheel a hub, a plurality of rigid spokes extending from the hub, a plurality of rigid fellies, pivotal means connecting the fellies with the spokes, and a flexible rim disposed around the fellies.

In testimony whereof I have signed my name to this specification in the presence of the two subscribing witnesses.

PHILIP NURSE.

Witnesses:
  EVERARD B. MARSHALL,
  PHILIP D. ROLLHAUS.

Copies of this patent may be obtained for five cents each, by addressing the "Commissioner of Patents, Washington, D. C."